A. C. Kasson.
Coffee-Pot.
No 3238
Reissued Dec. 22, 1868
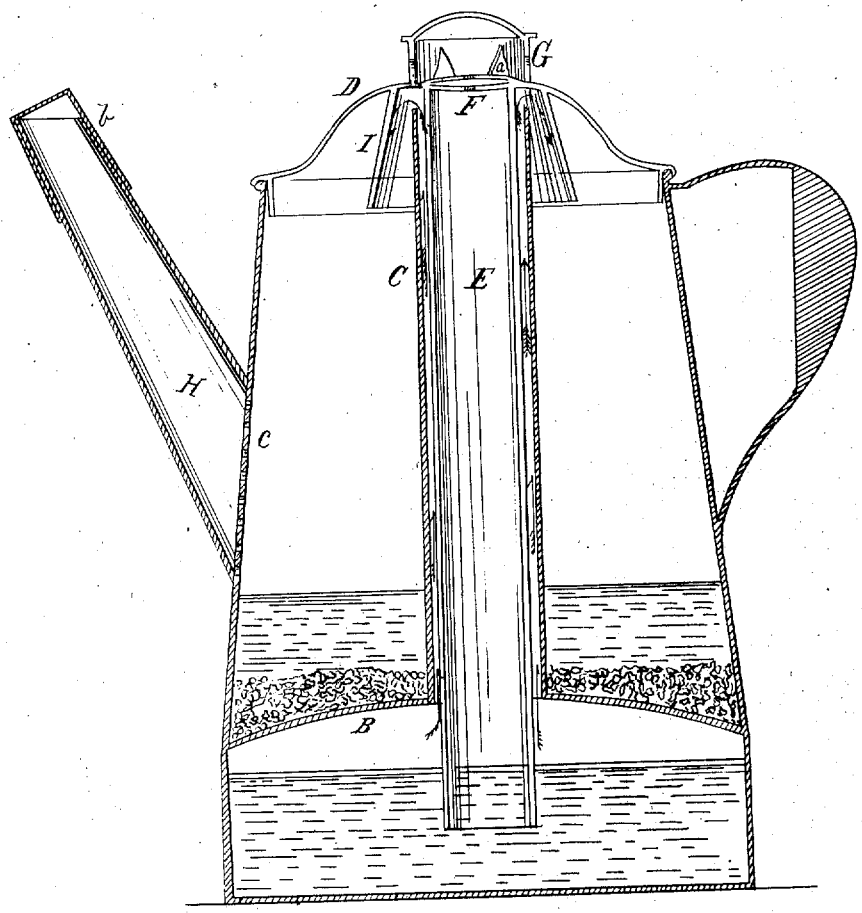
Witnesses
P. T. Dodge
E. Day
Inventor
A. C. Kasson
by Dodge & Munn
his attys

United States Patent Office.

AMASA C. KASSON AND NELSON C. GRIDLEY, OF MILWAUKEE, WISCONSIN, ASSIGNEES OF A. C. KASSON.

*Letters Patent No.* 77,291, *dated April* 28, 1868; *reissue No.* 3,238, *dated December* 22, 1868.

IMPROVEMENT IN TEA AND COFFEE-POTS.

The Schedule referred to in these Letters Patent and making part of the same.

*To all whom it may concern:*

Be it known that we, AMASA C. KASSON and NELSON C. GRIDLEY, of the city of Milwaukee, State of Wisconsin, are the owners of the Letters Patent, No. 77,291, dated April 28, A.D. 1868, granted to the said AMASA C. KASSON, for "Improvement in Tea and Coffee-Pots;" and we do hereby declare the following to be a full, clear, and exact description of the same, reference being had to the accompanying drawings, forming a part of this specification, and to the letters of reference marked thereon, like letters indicating like parts wherever they occur.

To enable others skilled in the art to construct and use the invention, we will proceed to describe it.

The invention relates to tea or coffee-pots, and consists in certain new and useful improvements in their construction, for increasing their utility, as well as their efficiency in cooking the coffee or tea, extracting the full strength, and retaining all the aroma thereof, without boiling, filtering, or evaporation, by means of the heat of steam.

The drawing represents a longitudinal vertical section of the pot.

It is constructed by placing within or attaching to the body of a common tea or coffee-pot, of any desired size, a false convex bottom, B, at a point distant from the real bottom, about one-fourth of the height of the same, as shown in the drawing.

This false bottom B is made convex, so that when the pot is turned upside down, the water or other substance beneath it will run to its centre, and thus render the cleaning of it easy.

In the centre of the false bottom B is made a circular hole or opening, and attached to this false bottom B, so as to connect directly with this hole or opening, is a vertical tube, C, made sufficiently long to extend a short distance above the body of the pot, but not quite to the under side of the cover D, as shown in the drawing.

In the centre of the cover D, which is convex on its upper surface, being raised in the ordinary way, is made an opening or hole, a little smaller than the one in the false bottom B, and attached to the cover, on its under side, so as to connect directly with this opening, is a tube, E, of the proper size to pass loosely within the tube C, and long enough to extend to about half way between the false and real bottoms of the pot, as shown in the drawing.

To the under side of the cover D, and around the tube E, is attached a conical deflecting-tube or hood, I, large enough to fit loosely over the main tube C, and long enough to cause any of the water in the lower chamber that may, through carelessness and unskilfulness in using the pot, pass up and over the tube C, to strike against its inner surface, and to be directed downward upon and into the tea or coffee being prepared in the upper chamber.

In the top of the tube E is inserted a whistle, F, made in the form or shape of an ordinary tin whistle, and which, when air or steam from the lower chamber of the pot shall pass through it, will give out the sound produced by blowing through it in the common way.

On the upper side of the cover D, and immediately over the upper end of the tube E, is attached a cap, G, with perforations or holes, *a*, in its sides, to allow the escape of air or steam passing up the tube E, and through the whistle F, and also as a cover and protection for the upper end of the tube, as also shown in the drawing.

The spout H is provided, at its upper end, with a cover, *b*, and at its lower end with a screen, *c*, in the usual manner.

In preparing the pot for use, pour hot or cold water through the tube C, until the lower chamber is nearly filled. Within the upper chamber of the pot, and around the tube C, is placed the tea or coffee, and hot water is poured thereon, to within two inches of the top of the pot; then put on the cover D tight, and also the cover *b*, of the spout H, and place the pot on the stove or fire. Allow the water in the lower chamber to boil about twenty minutes; then remove the pot from the stove or fire, and let it remain undisturbed for three minutes. The coffee or tea is then ready for use.

By this construction of pot there is no boiling or filtering of the tea or coffee, and consequently no portion of the aroma of the tea or coffee is evaporated, but is all retained within the pot. The strength of the tea or coffee is fully and thoroughly extracted. The tea or coffee is steeped or cooked, and kept hot, and just below the boiling-point, by means of the heat of the steam generated from the water in the lower chamber, which, as it ascends, comes in contact with and heats the whole surface of the false bottom B, and then passes up between the tubes C and E, in the direction of the red arrows, and striking against the conical deflecting-tube or hood I, is deflected downward, and is condensed upon the surface of the tea or coffee being prepared in the upper chamber, adding to its heat, mingling with and purifying it.

The tube E, when in place within the tube C, tends to pack the steam, and prevents too free a flow and condensation thereof, into and within the upper chamber, and upon the surface of the tea or coffee being prepared therein.

The steam rising through the tube E, or the air, so long as the water is above the lower end of the tube E, will make a low simmering sound, but when the water falls below the end of the tube, the steam will operate the whistle F, so as to be distinctly heard, and thus give a prompt alarm of the condition of the water in the lower chamber. This sound will continue for some time, so as to give ample time to remove the pot from the fire or stove, or to supply it with water, before being injured. The sound given out by the whistle will thus indicate the height of the water in the lower chamber, and give instant alarm when it becomes so low that there is danger of the pot being injured by the fire.

The advantages of this pot are, its simplicity of construction, ease in cleaning the lower chamber by means of the convex false bottom; the cooking of the tea or coffee without boiling, filtering, or evaporation, and extracting the full strength thereof; the preserving or retaining of all of the aroma of the tea or coffee, and retaining and condensing the steam within the pot. It never boils over; hence no smell arises, and no soiling of the stove. It is self-regulating, notifying the cook when more water is needed in the lower chamber to prevent burning or melting out of the bottom of the pot.

We are aware that coffee-pots have been constructed with a water-chamber below or around the coffee-chamber, and connected with it by means of central or other tubes; but in all these cases additional pipes are provided to aid circulation or to supply water from another chamber. These we do not claim; but having thus described the invention,

What we claim, and desire to secure by Letters Patent, is—

1. A tea or coffee-pot, when made with two chambers—one for the tea or coffee, and the other for water for generating steam, substantially as described.

2. A tea or coffee-pot, so arranged that the heat shall be communicated to the tea or coffee by means of steam, substantially as described.

3. A tea or coffee-pot, so arranged that the tea or coffee shall be steeped or cooked without boiling, filtering, and evaporation, by means of the heat of steam, substantially as described.

4. A tea or coffee-pot, consisting of an upper chamber for the tea or coffee, and a lower chamber, B, for water for generating steam, with an outer central tube, C, attached, and cover D, with tube E, whistle F, and hood I, all constructed and arranged substantially as described.

5. In combination with the water and steam-chamber B and central tube C, the cover D, with hood I and tube E, when constructed and arranged substantially as herein described.

6. The cover D, with the tube E and conical deflecting-tube or hood I, attached substantially as described.

A. C. KASSON.
N. C. GRIDLEY.

Witnesses:

SAM'L I. BRIDGE,
FRED. T. DAY.